United States Patent
Bates et al.

(10) Patent No.: US 6,711,696 B1
(45) Date of Patent: Mar. 23, 2004

(54) METHOD FOR TRANSFERING DATA BETWEEN TWO DIFFERENT CLOCK DOMAINS BY CALCULATING WHICH PULSES OF THE FASTER CLOCK DOMAIN SHOULD BE SKIPPED SUBSTANTIALLY SIMULTANEOUSLY WITH THE TRANSFER

(75) Inventors: Michael E. Bates, Austin, TX (US); Brian D. McMinn, Buda, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 611 days.

(21) Appl. No.: 09/637,985

(22) Filed: Aug. 11, 2000

(51) Int. Cl.$^7$ ............................................. G06F 1/12
(52) U.S. Cl. ......................................... 713/600; 713/601
(58) Field of Search ................................. 713/600, 601; 710/59, 60, 61

(56) References Cited

U.S. PATENT DOCUMENTS

| | | | |
|---|---|---|---|
| 4,419,739 A | | 12/1983 | Blum |
| 4,866,310 A | | 9/1989 | Ando et al. |
| 5,045,725 A | | 9/1991 | Sasaki et al. |
| 5,224,129 A | | 6/1993 | Lueker et al. |
| 5,448,715 A | | 9/1995 | Lelm et al. |
| 5,768,529 A | | 6/1998 | Nikel et al. |
| 5,999,023 A | | 12/1999 | Kim |
| 6,119,226 A | * | 9/2000 | Shiau et al. .................... 713/2 |
| 6,356,942 B1 | * | 3/2002 | Bengtsson et al. .......... 709/220 |
| 6,396,887 B1 | * | 5/2002 | Ware et al. .................. 375/354 |
| 6,424,688 B1 | * | 7/2002 | Tan et al. .................... 375/354 |

FOREIGN PATENT DOCUMENTS

JP 2000036241 A * 2/2000 ........... H01H/85/00

OTHER PUBLICATIONS

"Low Power Programming Technique Polysilicon–Resistor Fuses.", IBM Technical Disclosure Bulletin, Feb. 1, 1985, US, p. 5448.*
AMD Athlon ™ Processor Technical Brief, Dec. 1999, © Advanced Micro Devices, Inc., pp. 1–7.
AMD Athlon ™ Processor Module Data Sheet, Jun. 2000, © Advanced Mirco Devices, Inc., pp. 1–64.
LXT9785 Data Sheet, Sep. 2000, © Level One Communications, Inc., pp. 1–105.

* cited by examiner

*Primary Examiner*—Thomas Lee
*Assistant Examiner*—Paul Yanchus, III
(74) *Attorney, Agent, or Firm*—Meyertons, Hood, Kivlin, Kowert & Goetzel, P.C.; B. Noël Kivlin

(57) ABSTRACT

A method and related system for transferring data between systems having different clock domains. A skip signal generation circuit calculates substantially simultaneously with the transfer of data which signals of the faster clock domain should be skipped to ensure proper operation. The skip signal generation circuit makes this determination using values representing the faster and slower frequencies of each clock domain. These values are obtained either from preset values integrated in some form onto the microprocessor substrate, or may be written to the microprocessor by external circuitry and software. The skip signal generation circuit is capable of calculating skip patterns for any ratio of faster to slower frequency and is not constrained to have integer or half-integer ratios of the faster and slower clock domains.

28 Claims, 5 Drawing Sheets

METHOD FOR TRANSFERING DATA BETWEEN TWO DIFFERENT CLOCK DOMAINS BY CALCULATING WHICH PULSES OF THE FASTER CLOCK DOMAIN SHOULD BE SKIPPED SUBSTANTIALLY SIMULTANEOUSLY WITH THE TRANSFER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to computer system microprocessors. More particularly, the invention relates to the use of clock skipping techniques to transfer data between different clock domains.

2. Background of the Invention

In simple computer systems, a single clock signal may be used to run all of the devices which are integrated into the microprocessor chip. As shown in FIG. 1, a system clock 11 may provide a clock signal to a microprocessor or central processing unit ("CPU") 12, a memory 13 and a peripheral device 14 via clock line 16. The signal on clock line 16 is used to clock data transfers between the devices on bus 15.

While implementation of the system illustrated in FIG. 1 is simple and relatively straightforward, its simplicity results in performance limitations. One of these limitations relates to variations in the clock signal seen by devices on the chip. The use of a network of conductive traces to deliver the clock signal to each of the devices causes reflections, noise and other uncertainties in the signal. These factors cause differences in the signals delivered to different devices, which may in turn limit the devices' ability to communicate data.

In the simple system illustrated in FIG. 1, a data transfer involves two devices in the same clock domain. The term "clock domain" refers to a portion of a system in which the operation of associated devices is based on a particular clock signal. Thus, the operations of the devices in that particular clock domain are based upon clock signals having the same frequency. In the absence of any clock skew, data transferred from one of these devices to the other must be asserted for a period of time before the data is sampled (the setup time) and a period of time after the data is sampled (the hold time.) If there is any skew, differences in clock signals caused by propagation times to various components, reflections, etc., between the clock signals at each of the devices, the assertion of the data must be maintained for an additional amount of time which is long enough to account for this difference. While this additional time may not be significant in relation to slower clock speeds, high-speed microprocessors have shorter clock periods so it may not be possible to perform data transfers quickly enough to keep up with the speed of the processor.

Clock forwarding is one technique used to minimize the impact of clock skew and allow improved performance in data transfers. In a clock forwarding scheme, the data bus and system clock described above are replaced by point-to-point data and clock signals. When data transfers from one device to another, it transfers along with a corresponding clock signal. Referring to FIG. 2, data transfers on one or more data lines 18 while a clock signal forwards on clock line 19. Data clocks into a series of storage locations (i.e. flip-flops) according to the forwarded clock signal. Data clocks out of the storage locations according to a clock signal of the receiving device (not shown). Both clock signals must have the same rate, but a substantial skew in the signals will not prevent reliable transfer of the data.

While clock forwarding techniques transfer data between devices operating at the same clock rate, it is often desirable in modern computer systems to use different clock frequencies for different devices. For example, it may be useful to operate the core logic (i.e., the microprocessor logic) and the system or peripheral logic at different frequencies. The difference in frequencies allows for advances in the performance of one type of logic without requiring equal advances in the other type of logic. Thus, for example, the processor speed can be increased without having to also speed up the system logic.

In these systems, system logic (logic on the microprocessor chip that interfaces the high speed core logic to the remaining, lower speed, system components) is closely tied to the system bus (the bus across which the microprocessor communicates with the rest of the computer system). System logic of the prior art operates at a frequency which is an integer or half-integer multiple of the system bus frequency. Because the system logic operates at a frequency which is a multiple of the system bus frequency, clock signals for the system logic can be generated from the same clock as the clock signals for the system bus. If the core logic also runs at a frequency which is an integer or half-integer multiple of the system bus frequency, it can also be easily generated from the system bus clock signal. For example, if the system bus is running at 66 MHz, the system logic and core logic can be operated at 200 MHz (three times the system bus frequency). Then, if desired, the frequency of the core logic can be scaled up to 266 MHz (four times the system bus frequency), while the system logic remains at 200 MHz.

As the operating frequency of the system bus increases, however, it becomes more and more difficult to scale up the speed of the core logic because this requires a larger increase in frequency. For example, if the system bus is running at 400 MHz and both the core logic and the system logic are running at 800 MHz, in the prior art the core logic cannot easily scale up to 900 MHz because 900 MHz is not an integer or half-integer multiple of the system bus frequency. It may therefore be useful in operating the core logic at non-integer or non-half-integer frequencies to operate the different sets of logic using multiple clocks.

While having multiple clock sources may solve the problems associated with operating the core logic at non-integer and non-half-integer frequencies, new problems arise associated with transferring information between the two clock domains. For example, in a write operation from the higher frequency clock domain to the lower frequency domain, even in a clock forwarded arrangement, the higher frequency clock domain overruns the lower frequency clock domain unless steps are taken to prevent this. In the prior art, this problem was addressed by periodically and systematically skipping clock pulses of the higher frequency clock domain such that the lower frequency clock domain removed data from interface buffers at the same rate as the effective transfer clock domain. However, calculating which clock pulses of the higher frequency clock to skip in the prior art is cumbersome. For example, a computer system designer of the prior art may have had to calculate a skip pattern for each ratio of core frequency to system frequency for which the computer system would operate before the system implementation of the computer system.

Thus, it would be desirable to have a skip signal generation circuit that can calculate skip patterns to insure proper transfer of information between respective clock domains without having to work out those patterns in advance and without the requirement of the ratio of the core frequency to the system bus frequency being integer or half-integer.

BRIEF SUMMARY OF THE INVENTION

The problems noted above are solved in large part by a system and related method for transferring data from a first clock domain to a second clock domain, wherein the ratio of the clock rates is not constrained to be an integer or half-integer multiples. This is accomplished by use of a skip signal generation circuit preferably integrated onto the microprocessor substrate. The skip signal generation circuit reads increment values related to the peripheral frequency and the core frequency. The manufacturer writes this information in the microprocessor during manufacture by means of fusible links on the microprocessor substrate. Alternatively, in a computer system adapted to lower microprocessor operating frequencies, possibly to reduce power consumption, the increment values are those values supplied by external programs and hardware, possibly the basic input/output system ("BIOS"). The skip signal generation circuit calculates, substantially simultaneously with the data transfer, a skip signal which signifies the need to skip a clock pulse of the faster clock during data transfer between two clock domains. The skip generation circuit makes this determination by counting in increments related to the core frequency and the system or peripheral frequency. By comparing the count values associated with each of the core and peripheral or system frequencies, the skip signal generation circuit generates skip signals as necessary for the particular ratio of system frequency to core frequency. This ratio need not be an integer or half-integer relationship.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment comprises a system for transferring data from a first clock domain to a second clock domain, wherein the clock rates or frequencies of the domains are different, and are not constrained to be integer or half-integer multiples of each other.

The system is preferably implemented in a high-performance computing system. The computing system utilizes a microprocessor chip which includes on-chip peripheral logic. Because the core logic and the peripheral or system logic preferably operate at different frequencies, each has a separate network to create and distribute clock signals. Each of these two networks defines a separate clock domain.

Data transfer between the two clock domains preferably uses a clock forwarding technique. A first clock signal from a first clock domain is forwarded along with the data transferred from the first clock domain to a second clock domain. The data is temporarily stored in a series of storage locations. The first clock domain delivers data to the storage locations sequentially, and each datum is stored in a storage location when a corresponding clock pulse of the first clock signal is received. The second clock domain retrieves data from the storage location. The second clock domain retrieves data from the storage location when a corresponding clock pulse of a second clock signal from the second clock domain is received. Because the first and second clock signals have different clock rates, one or more clock pulses of the faster of the signals must be skipped in order to prevent the loading process from overrunning the reading process.

Figure 1:
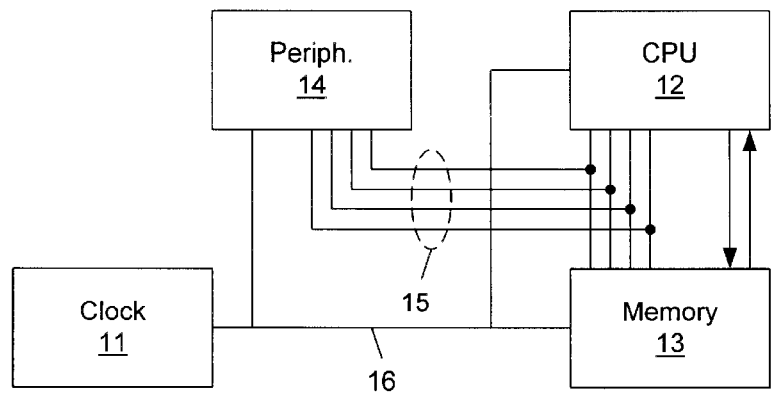
FIG. 1 is an example of a prior art computer system having a single clock domain.
Figure 2:
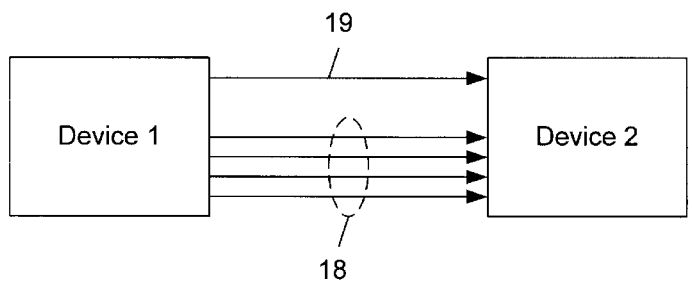
FIG. 2 is an illustration of two devices configured to transfer data using clock forwarding.
Figure 3:
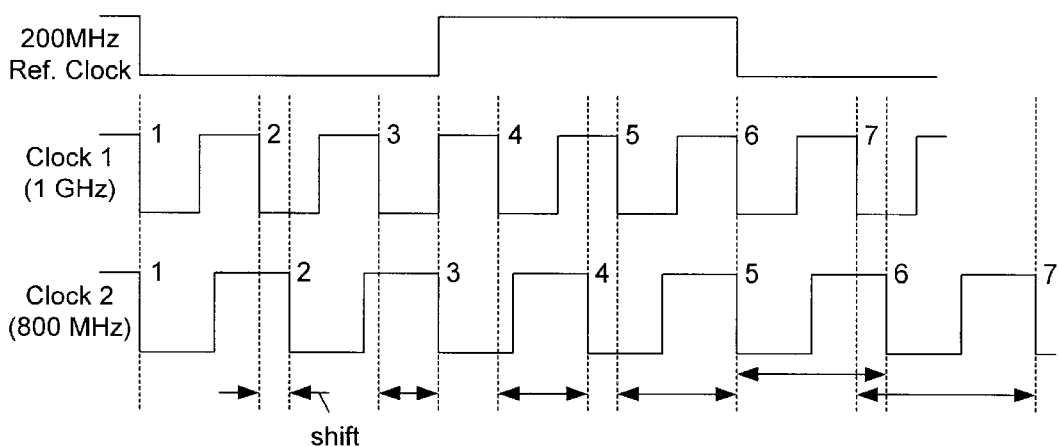
FIG. 3 is a timing diagram of clock signals for two clock domains and a reference clock signal.

Exemplary clock signals from two clock domains are shown in FIG. 3. This figure shows a reference clock signal as well as the clock signals for each of the two clock domains. In this example, the reference signal has a rate of 200 MHz. The clock signals for the two clock domains have rates of 800 MHz and 1.0 GHz. For the purposes of discussing this figure, the 1 GHz signal is referred to as the first signal, and the 800 MHz signal is referred to as the second signal.

As indicated in FIG. 3, there is no shift between the signals of the two clock domains at the beginning of the reference clock period. That is, they both have a falling edge at the same time as the reference clock. Because the first clock signal has a higher frequency than the second, the second falling edge of the first signal occurs before the second falling edge of the second signal. Thus, a shift develops between the two signals. This shift continually increases, so that the shift between the fifth falling edge of each clock signal in this example is equal to the period of the first clock signal. The shifts between subsequent falling edges (e.g., sixth and seventh) overlap each other.

Assuming datum transmitted from a first clock domain on each pulse of the first clock signal, and a datum received in the second clock domain on each pulse of the second clock signal, the amount of transmitted data quickly outgrows the amount of received data if the two clock exemplified in FIG. 3 are used. If the first clock domain transmits to a finite number of storage locations, the stored data eventually overruns data yet to be retrieved from the storage locations, and some of the data is lost. Conversely, if the second clock domain transmits data (which has the slower clock rate) to the first clock domain (which has the faster clock rate,) the system eventually attempts to retrieve data from storage locations in which new data has yet to be stored. In either case, the operation of the system quickly breaks down.

Figure 4:
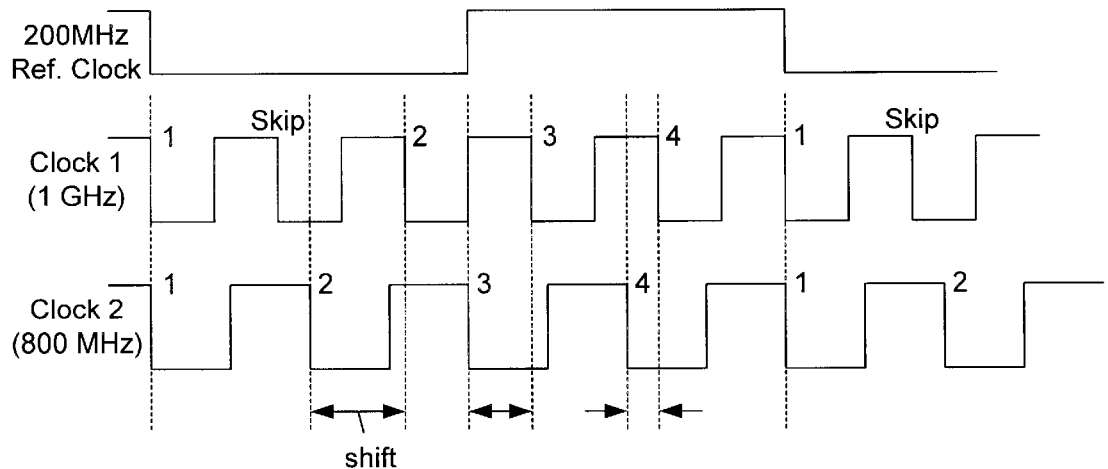
FIG. 4 is a timing diagram showing a pattern of valid and skipped pulses in one embodiment.

FIG. 4 exemplifies the clock skipping feature of the preferred embodiment. The falling edges of the respective clock signals are regarded as the pulses. On pulses which are skipped, the hardware performs no storing (or retrieving) in the corresponding clock domain. On pulses which are not skipped (also referred to herein as "valid" pulses,) the hardware stores (or retrieves) a data value from the storage location. The same clock signals as in FIG. 3 (i.e., signals having the same clock rates) are illustrated in this figure. In this example, every fifth pulse of the first clock signal is skipped (as indicated by the pulse numbers and the notation "skip" above the respective skipped pulses.)

FIG. 4 illustrates that, for the first (1 GHz) clock domain, the second pulse of every reference clock period is skipped. If the first falling edge of each clock signal synchronizes with the falling edge of the reference clock signal, skipping the second pulse in each reference clock period ensures that the pulses of the first clock signal are synchronized with, or shifted to the right of (i.e., lagging behind), the corresponding pulses of the second clock signal.

By periodically skipping pulses (i.e., not storing/ retrieving data on the "skipped" pulses) as illustrated in FIG. 4, the system ensures that the number of pulses on which data loads into the storage locations equals to the number of pulses on which data is retrieved from the storage locations. This prevents the faster clock domain from overrunning data in the storage locations or reading storage locations in which there is no valid data.

Figure 5:
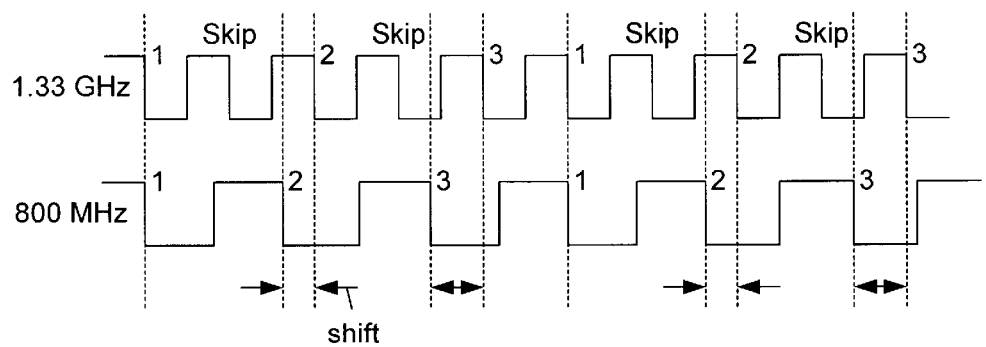
FIG. 5 is a timing diagram showing a pattern of valid and skipped pulses in an alternate embodiment.

In the example above, the skip pattern includes one skipped pulse for every four valid pulses. In other embodiments, the skip pattern changes. For example, FIG. 5 shows that, for clock domains having frequencies of 800 MHz and 1.33 GHz, the skip pattern has one valid pulse, one skipped pulse, one valid pulse, one skipped pulse, one valid pulse, and then repeats. This pattern sometimes has one valid pulse between skipped pulses, and sometimes has two. Because the same reference clock generates each of the clock signals, the pattern repeats periodically.

Figure 6:
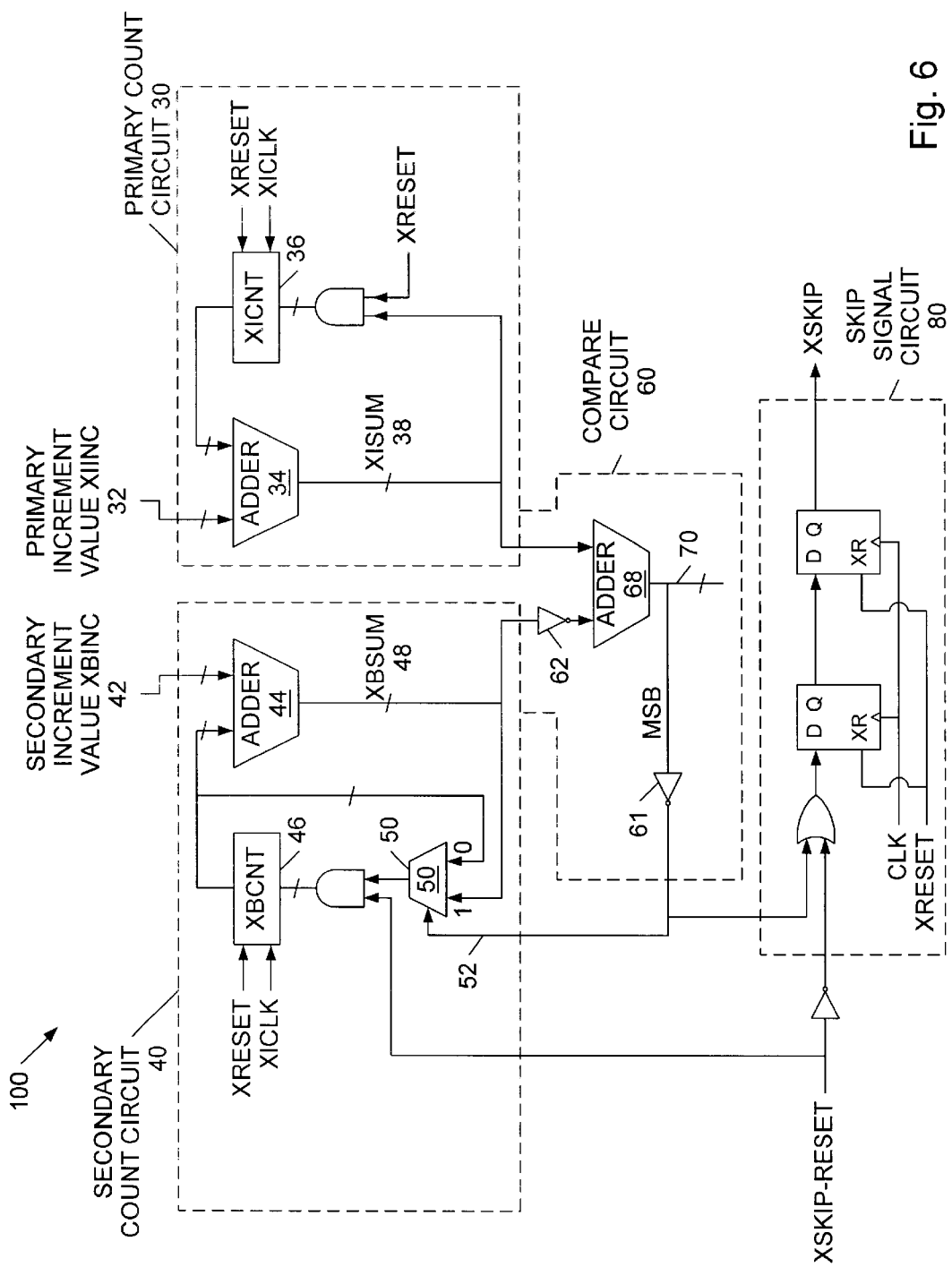
FIG. 6 is an electrical schematic of the preferred embodiment circuit to dynamically calculate skip patterns.

Thus, periodically and systematically skipping pulses of the faster clock domain addresses the problems associated with transferring data between two clock domains having different frequencies such that the effective transfer clock has the same frequency as the slower clock domain. FIG. 6 shows an electrical schematic of a circuit of the preferred embodiment which calculates, substantially simultaneously with a data transfer, which clock pulses of the faster clock domain to skip. The electrical schematic has four main components: 1) a primary count circuit; 2) a secondary count circuit; 3) a compare circuit; and 4) a skip signal generation circuit.

The primary count circuit 30 generates a primary count value based on the frequency of the slower of the two clock domains. The primary count circuit 30 accomplished this task first by reading a primary increment value 32. The primary increment value 32 is a value which represents the frequency of the slower clock domain. That is, the primary increment value 32 in the preferred embodiment is a value that represents the frequency of operation of the peripheral or system logic associated with a microprocessor. Explaining the origin of the primary increment value 32, however, requires a brief digression into microprocessors generally.

Microprocessors, like most any semiconductor device, are built on semiconductor substrates. Variations encountered during the building process, even for microprocessors of the same design, may require operating a particular microprocessor at frequencies and voltages different from other microprocessors of the same design. These varying frequencies and varying voltages however all exist within a known range. Some mechanism must exist to inform the microprocessor itself, and possibly related peripheral devices, of the operating parameters of the particular microprocessor. Preferably, each microprocessor has fusible links built on the microprocessor substrate that are selectively burned. The pattern of burned and non-burned fusible links represents, for our purposes, the frequency of operation. Preferably there are a plurality of sets of fusible links, with one of the plurality representing the frequency of the core logic and another representing the frequency of the peripheral logic. Thus, there is information available on each microprocessor, placed there as part of the build process, which represents the frequency of the core logic and the peripheral logic.

Figure 7:
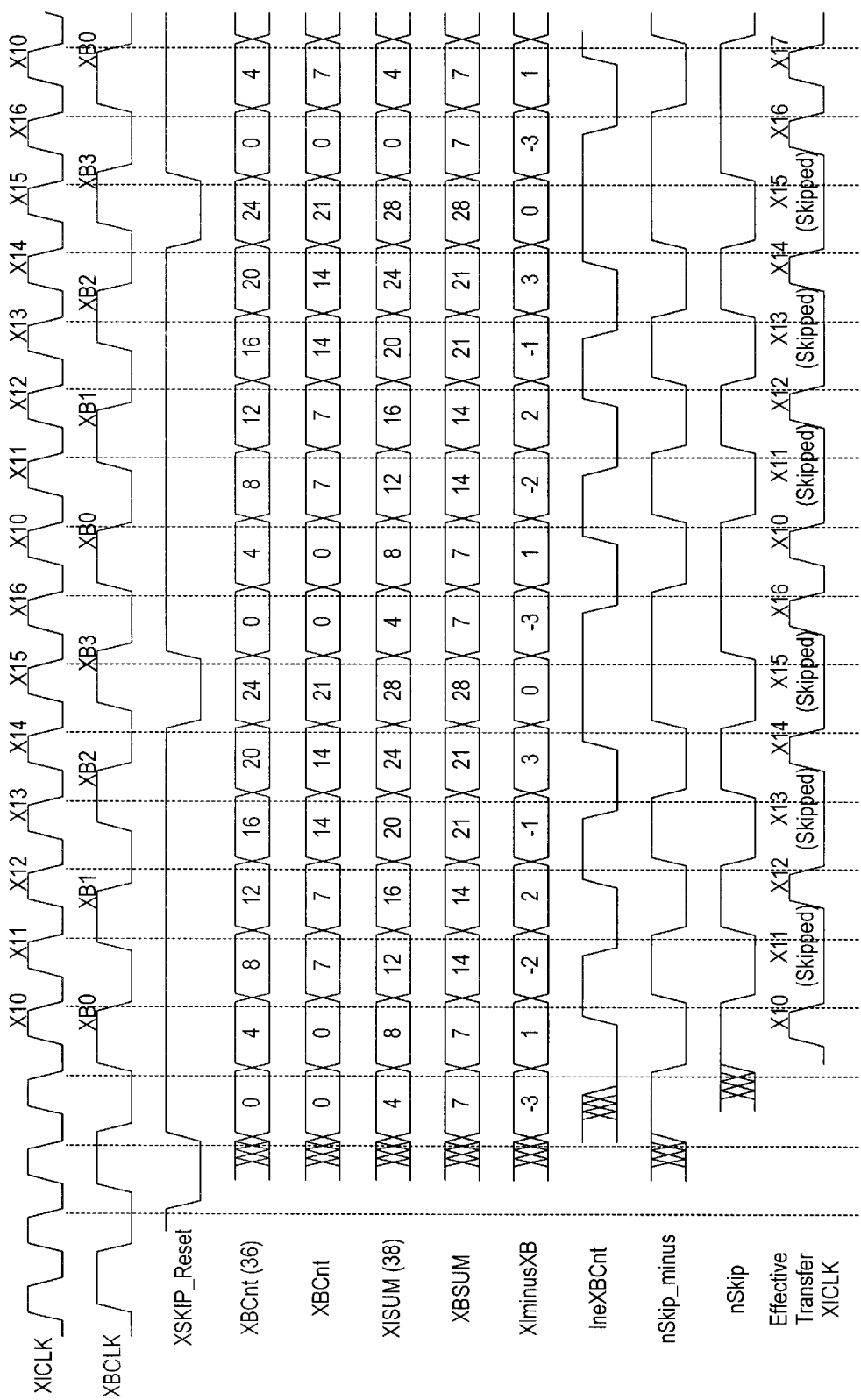
FIG. 7 is a timing diagram showing various values and states for operation of the preferred embodiment hardware with the core frequency clock operating at 700 MHz and the system or peripheral frequency clock operating at 400 MHz.

Returning to the preferred embodiment of this invention exemplified in FIG. 6, the primary count circuit 30 reads a primary increment value 32. The primary increment value 32 in one embodiment is the value represented by the fusible links. More specifically, the primary increment value 32 is a value representing the frequency of the peripheral logic of the microprocessor. This primary increment value 32 couples to one set of inputs of the primary adder 34. The primary adder's 34 second input is coupled to a primary count register 36. As is indicated in FIG. 6, primary adder 34 produces a primary look-ahead value, or primary sum or XISUM 38. The XISUM 38 represents the next value to be clocked into the primary count register 36. FIG. 7 shows an exemplary timing diagram of operation of the circuit shown in FIG. 6. Shown in FIG. 7 are two clock signals XICLK, a 700 MHz clock, and XBCLK, a 400 MHz clock. FIG. 7 shows both the primary count register 36 values as well as the XISUM 38 values. It can be clearly seen in FIG. 7 that the primary count 36 preferably increments with each falling edge of the faster clock, XICLK. In this example, the primary count circuit 30 counts by a value representing the frequency of the slower clock, XBCLK. In the exemplary timing diagram of FIG. 7, the primary increment value 32 is 4, which value represents the 400 MHz frequency of the slower clock. Also shown in FIG. 7 is the XISUM 38, to be held in the primary count register 36 on the next falling edge of the XICLK. Thus, the primary count circuit 30 counts in increments based on the frequency of the slower clock.

FIG. 6 also shows a secondary count circuit 40. In broad terms, the secondary count circuit 40 selectively generates count values which increment based on the frequency of the faster of the two clock domains. That is, the secondary count circuit 40 selectively increments based on a secondary increment value 42. Much like the primary increment value 32, the secondary increment value 42 in one embodiment is a value represented by a plurality of fusible links. These fusible links are selectively burned to represent the frequency of the faster, or core, logic of the microprocessor. This secondary increment value 42 couples to one input of a secondary adder 44. The secondary adder 44 has its second input coupled to a value held by a secondary count register 46. Thus, the secondary adder 44 generates a look-ahead value, or primary sum or XBSUM 48 that is the addition of the secondary increment value 42 with the value held by the secondary count register 46. However, unlike the primary count circuit 30, the secondary count circuit 40 preferably does not place the look-ahead value or XBSUM 48 in the secondary count register 46 with each falling edge of the faster clock, XICLK. Rather, and as will be explained in more detail below, the secondary count circuit 40 selectively places the look-ahead or XBSUM 48 into the secondary count register 46 based on a comparison of the look-ahead value or XISUM 38 for the primary count circuit 30 with the look-ahead value or XBSUM 48 of the secondary count circuit 40.

This selective clocking of the look-ahead value or XBSUM 48 into the secondary count register 46 is preferably accomplished by use of a multiplexer 50. The multiplexer 50 couples one of the secondary count register 46 value or the XBSUM 48 to an input of the secondary count register 46. This selective coupling by the multiplexer 50 operates based on the state of its select input signal 52, which becomes asserted or non-asserted based on the outcome of the operation of the compare circuit 60.

It is noted that both the primary count register 36 and the secondary count register 46 are shown in FIG. 6 to load based on the faster clock, XICLK. While the primary count circuit 30 preferably increments with each falling edge of the faster clock, XICLK, the secondary count circuit 40 either clocks in the last value held by the secondary count register 46 or clocks in the look-ahead or XBSUM 48 with each falling edge of the faster clock.

Compare circuit 60 couples to both the primary count circuit 30 and the secondary count circuit 40. In broad terms, the compare circuit 60 preferably compares the look-ahead count value 38 of the primary count circuit 30 to the look-ahead count value 48 of the secondary count circuit 40. Based on this comparison, the compare circuit 60 selects the next input to be coupled to the secondary count register 46 and also initiates the generation of a skip signal. Referring again to FIG. 6, the compare circuit 60 makes this comparison by adding the look-ahead value or XISUM 38 of the primary count circuit 30 to a negated look-ahead value or XBSUM 48 of the secondary count circuit 40. The compare circuit 60 negates the XBSUM 48 before the comparison by a circuit represented by NOT gate 62. The exact nature of the circuit represented by NOT gate 62 can take one of two forms. In one form, the "negation" takes place by taking the one's compliment of the XBSUM 48 value, and setting a carry-in on the first stage of the adder 68. This first method is equivalent to a second method of having the NOT gate circuit 62 directly take the two's compliment of the XBSUM 48 value. Adding the XISUM 38 value to a two's complimented XBSUM 48 value is equivalent to subtraction. One of ordinary skill in the art knows and understands one's and two's compliment binary addition. Thus, the compare circuit 60 compares the XBSUM 48 with the XISUM 38 to determine which is larger.

Figure 8:
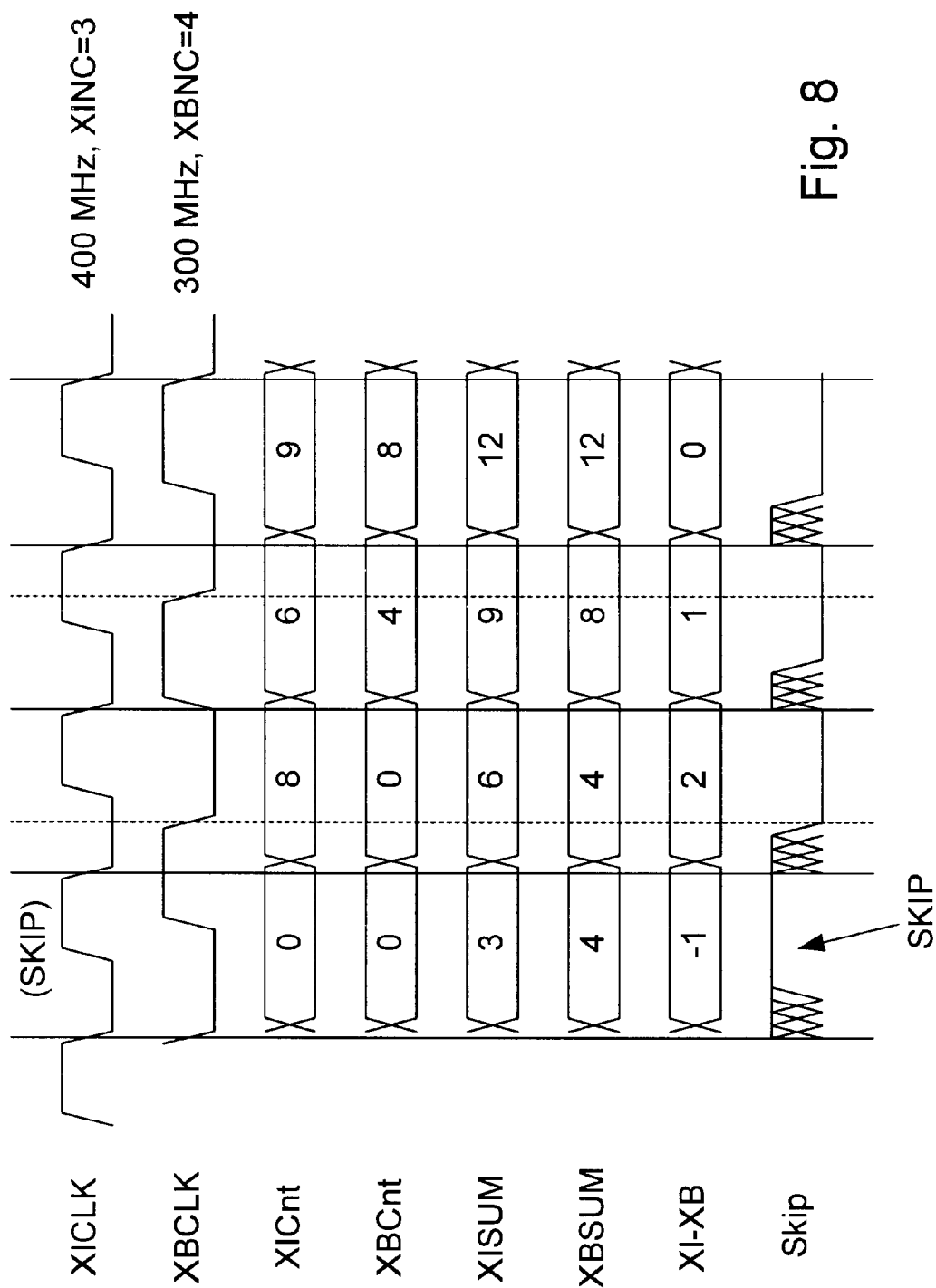
FIG. 8 is an exemplary timing diagram of the various values and states for operation of the preferred embodiment hardware with the core frequency clock operating at 400 MHz and the system or peripheral frequency operating at 300 MHz.

FIG. 8 shows a second exemplary timing diagram of the various values and states generated by the skip signal generation circuit 100. Shown in FIG. 8 is an XICLK operating at 400 MHz and XBCLK operating at 300 MHz. The XICLK represents a core frequency and the XBCLK represents a peripheral logic frequency. It can be seen that the ratio of the core frequency to the peripheral frequency in this example is not an integer or half-integer multiple. For these two clock signals the primary increment value 32 and the secondary increment value 42 are 3 and 4 respectively. After de-assertion of the XRESET signal (not shown on FIG. 8) the skip signal generation circuit 100 begins the process of calculating which clock pulses of the faster clock, XICLK, should be skipped in a data transfer between the two clock domains. Initially, both the primary count register 36 and the secondary count register 46 contain a value of zero. However, both the primary adder 34 and the secondary adder 44 generate look-ahead values XISUM 38 and XBSUM 48 respectively. As shown in FIG. 8, given the primary and secondary increment values of 3 and 4 respectively, the look-ahead values for the primary and secondary increment circuits (XISUM 38 and XBSUM 48) are 3 and 4 respectively during the first clock period of the calculation. Compare circuit 60, coupled to the XISUM 38 and the XBSUM 48, effectively subtracts the look-ahead value or XBSUM 48 from the look-ahead value or XISUM 38 to create a compare output 70. In the first clock period of the faster clock in the exemplary timing diagram of FIG. 8, the compare output 70 is a negative number. Having a negative compare output 70 causes two actions. The first action is coupling of either the secondary count register 46 output or the look-ahead or XBSUM value 48 to the input of the secondary count register 46, by way of multiplexer 50. Preferably, if the compare output 70 is a negative number, as is the case in the first clock period shown in FIG. 8, the output of the secondary count register 46 couples back to its input which therefore disallows an increment of the secondary count circuit 40. Secondly, having a negative value for the compare output 70 indicates a need to skip the next successive clock pulse of the faster clock, XICLK, which is generated by the skip signal circuit 80. Compare circuit 60 also has a second NOT gate 64 which acts to logically NOT the most significant bit of the compare output 70.

Thus, in the exemplary timing diagram of FIG. 8, the skip signal generation circuit 100 generates a skip signal indicating that the first clock pulse of the faster clock should be skipped to ensure proper operation of the data transfer. In the next series of events in FIG. 8 it is seen that the comparison of the look-ahead values is positive and therefore no skip signal is generated and the secondary count circuit 40 is allowed to increment by the value of the secondary increment value 42, which in this example is 4. Skip signal generation circuit 100 calculates, substantially simultaneously with a data transfer, which pulses of the faster clock, XICLK, must be skipped to ensure proper data transfer. This calculation was accomplished using increment values already encoded within the microprocessor itself.

The timing diagram of FIG. 7 shows the various signals and values where the faster or core frequency clock, XICLK, operates at 700 MHz and the peripheral or slower clock, XBCLK, operates at 400 MHz. In this example, the primary increment value 32 equals 4 and the secondary increment value 42 equals 7. Three of the clock pulses of the faster clock, XICLK, must be skipped to ensure proper data transfer between the two clock domains given these two frequencies of operation.

Although not shown in FIG. 8, FIG. 7 shows the XSKIP-RESET signal in relation to the other signals in the timing diagram. FIG. 7 shows that between successive XSKIP-RESET signals the skip signal generation 100 operates to calculate which pulses of the faster clock domain should be skipped. However, FIG. 7 shows the series of calculations beginning a full 2 clock periods before alignment of the falling edges of the faster and slower clock domains. Beginning the calculation before this alignment ensures that the skip signal generation circuit 100 has sufficient time to calculate and distribute which signals of the faster clock, XICLK, should be skipped. Generation of this XSKIP-RESET signal is the subject of another, co-pending application Ser. No. 09/429,117, which disclosure is incorporated herein by reference as if reproduced in full below. Because the skip signal generation circuit 100 calculates slightly in advance the transfer of information, some mechanism must exist to align the generated skip signal with the pulse to which it should be applied. This mechanism is the skip signal circuit 80 shown in FIG. 6. XRESET is the system reset that is asserted to clear the state of the processor at system start-up.

The primary purpose of the skip signal circuit 80 is to generate a skip signal, with proper timing, based on the compare output 70 of the compare circuit 60. More specifically, the skip signal circuit 80 couples to a most significant bit of the compare output 70. When the compare output 70 of the compare output circuit 60 is a negative number, this indicates a need to skip a particular clock pulse of the faster clock. It is mentioned above that at least with respect to the timing diagram of FIG. 7 that the skip signal generation circuit 100 calculates a skip pattern at least two clock pulses ahead of the actual data transfer. Therefore, the skip signal circuit 80 preferably delays the skip signal by two complete clock pulse such that a skip signal aligns with the appropriate pulse of the faster clock, XICLK. Preferably this is accomplished by means of two D-flip-flop which act to delay by two clock pulses the skip signal generated.

Thus, the skip signal generation circuit 100 calculates a skip pattern substantially simultaneously, as shown in FIG. 7 within two clock pulses, with data transfer between the faster and slower clock domains. The description of the embodiment to this point makes the calculations using values encoded by means of fusible links on the microprocessor itself. However, it is possible in some applications that the microprocessor core logic and peripheral logic may be selectively slow in frequency, possible to implement power saving features. Preferably this is accomplished by basic input/output system ("BIOS") slowing the core and peripheral frequency of the microprocessor by writing different values, representing the desired core and peripheral frequencies, to registers within the microprocessor. The ability to selectively change the frequency of the microprocessor however does not affect operation of the skip signal generation circuit 100. This only works with a change in the determination of the primary and secondary increment values 32 and 42 respectively. In a microprocessor having this ability, the primary and secondary increment values couple to the values written by BIOS. Operation of the circuit is otherwise unchanged. It may be that the BIOS writes values representing the core and peripheral frequencies directly, or preferably BIOS simply writes a single value representing a base frequency by which both the peripheral and core frequency values encoded by means of fusible links are multiplied to obtain proper primary and secondary increment values 32 and 42.

The above discussion is meant to be illustrative of the principles and various embodiments of the present invention. Numerous variations and modifications will become apparent to those skilled in the art once the above disclosure is fully appreciated. For example, there may be many electrical circuits capable of performing the calculation of skip patterns, all of which would be within the contemplation of this invention. The preferred embodiment also is disclosed as calculating skip signals two clock pulses ahead of the actual need, however, this calculation could be many clock pulses ahead or done in real-time with the data transfer, hardware speed allowing. Further, the disclosure has focus on data transfer within a microprocessor, however, any system which transfers data between two clock domains could benefit from, and therefore be within the contemplation of, this disclosure. It is intended that the following claims be interpreted to embrace all such variations and modifications.

We claim:

1. In a system having at least two click domains, a first clock domain having a higher frequency than a second clock domain, a method of transferring data between the two clock domains comprising:
   calculating which clock pulses if the first clock domain should be skipped substantially simultaneously with the transfer of data between the two clock domains;
   wherein said calculating includes:
   determining a first value and a second value; and
   comparing the first value to the second value, wherein a clock pulse is skipped if the first value is less than the second value.

2. The method as defined in claim 1 further comprising:
   determining values representing the frequency of each of the two clock domains; and
   said calculating substantially simultaneously with the transfer of data based on the values representing the frequency of each of the two clock domains.

3. The method as defined in claim 2 wherein determining the values further comprises reading preset values represented by a plurality of fusible links selectively burned to indicate each of the two clock frequencies.

4. The method as defined in claim 2 wherein determining values representing the frequency of each of the two clock domains further comprises reading values being said preset values each multiplied by an adjustable base frequency value.

5. The method as defined in claim 1 further comprising generating a skip signal.

6. In a microprocessor having at least two clock domains, a method of producing skip signals, between successive reset signals, used to systematically skip pulses of a faster clock domain, the method comprising:
   determining a primary increment value and a secondary increment value;
   adding the primary increment value and a first count value to create a primary sum;
   selectively adding the secondary increment value and a second count value to create a secondary sum;
   comparing the primary sum to the secondary sum;
   if said primary sum is less than said secondary sum:
   generating a skip signal;
   if said primary sum is greater than said secondary sum:
   allowing the secondary sum to become the second count value.

7. The method as defined in claim 6 wherein determining the primary and secondary increment values further comprises:
   reading a primary increment value from within the microprocessor, said primary increment value proportional to the frequency of a slower clock domain; and
   reading a secondary increment value from within the microprocessor, said secondary increment value proportional to the frequency of the faster clock domain.

8. The method as defined in claim 6 wherein comparing the primary and secondary sum further comprises subtracting the secondary sum from the primary sum.

9. The method as defined in claim 8 wherein subtracting the secondary sum from the primary sum further comprises:
   negating the number of the secondary sum; and
   adding the secondary sum to the primary sum by way of an adder circuit.

10. The method as defined in claim 6 further comprising resetting each of the primary and secondary count values to zero responsive to said successive reset signal.

11. The structure of a system for transferring data between two clock domains in a microprocessor, with each clock domain having a different frequency, comprising:
   a primary count circuit adapted to generate a primary look-ahead value based on a frequency of a slower of the two clock domains;
   a secondary selective count circuit adapted to generate a secondary look-ahead value based on a frequency of a faster of the two clock domains;
   a compare circuit coupled to both the primary and secondary count circuits, wherein the compare circuit is adapted to compare the primary and secondary look-ahead values;
   a skip signal circuit coupled to the compare circuit adapted to generate a skip signal based on an output signal generated by said compare circuit.

12. The structure as defined in claim 11 wherein the primary count circuit further comprises:
   a primary adder having one set of add inputs coupled to a primary increment value, and having its second set of add inputs coupled to a primary count register's output signals; and
   a primary count register coupled to said primary adder's result signals being the primary look-ahead value, and wherein said primary count register is clocked with the faster clock signal.

13. The structure as defined in claim 12 wherein said primary count register is a plurality of D flip-flops.

14. The structure as defined in claim 11 wherein the secondary selective count circuit further comprises:
   a secondary adder having one set of add inputs coupled to a secondary increment value, and having its second set of add inputs coupled to a secondary count register's output signals, being the secondary look-ahead value;
   a multiplexer coupled to said secondary count register, said multiplexer adapted to selectively pass one of the secondary adder output value and the secondary count register output value to an input of the secondary count register based on a comparison generated by the compare circuit.

15. The structure as defined in claim 14 wherein said secondary count register is a plurality of D flip-flops.

16. The structure as defined in claim 11 wherein the compare circuit further comprises:
   a negation circuit having its input coupled to the secondary adder's output value, said negation circuit adapted to generate a negated value of the secondary adder's output value; and
   a compare adder having its augend inputs coupled to the primary adder's output value, and the compare adder having its addend inputs coupled to the negated value of the negation circuit, and wherein said compare adder generates a sum value.

17. The structure as defined in claim 16 wherein said secondary selective count circuit further comprises:
   a secondary adder having one set of add inputs coupled to a secondary increment value, and having its second set of add inputs coupled to a secondary count register's output signals;
   a multiplexer coupled to said secondary count register, said multiplexer adapted to selectively pass one of the secondary adder output value and the secondary count register output value to an input of the secondary count register based on a most significant bit of the sum value.

18. The structure as defined in claim 17 wherein the primary count circuit further comprises:
   a primary adder having one set of add inputs coupled to a primary increment value, and having its second set of add inputs coupled to a primary count register's output signals; and
   said primary count register coupled to said primary adder's result signals, and wherein said primary count register is clocked with the faster clock signal.

19. In a microprocessor having at least two clock domains, a faster clock domain having a shorter period than a slower clock domain, a method of generating skip signals to selectively skip pulses of the faster clock domain during transfers of information between the two clock domains comprising:
   incrementing a first count value by a number representing the period of the slower clock domain, said incrementing performed on each complete period of the faster clock domain;
   selectively incrementing a second count value by a number representing the period of the faster clock domain;
   calculating look-ahead values for each of the first and second count values, those look-ahead values being what each of the first and second count values would be if each were allowed to increment on the next clock period of the faster clock domain;
   comparing the look-ahead values to determine if the look-ahead value for the second count value is larger than the look-ahead value for the first count value;
   if the look-ahead value for the second count value is larger:
     generating a skip signal; and
     disallowing a next increment of the second count value.

20. The method as defined in claim 19 wherein before the incrementing steps the method further comprises determining the number representing the period of the slower clock.

21. The method as defined in claim 20 wherein determining the number representing the period of the slower clock further comprises reading a peripheral preset value represented by a plurality of fusible links selectively burned to represent the period of the slower clock.

22. The method as defined in claim 21 wherein reading the peripheral preset value further comprises reading values being a peripheral preset value multiplied by an adjustable base period value.

23. The method as defined in claim 19 wherein before the incrementing steps the method further comprises determining the number representing the period of the faster clock.

24. The method as defined in claim 23 wherein determining the number representing the period of the faster clock further comprises reading a core preset value represented by a plurality of fusible links selectively burned to represent the period of the slower clock.

25. The method as defined in claim 24 wherein reading the core preset value further comprises reading values being said core preset value multiplied by an adjustable base period value.

26. The method as defined in claim 19 wherein calculating look-ahead values further comprises:

adding the number representing the period of the slower clock domain to the first count value to create a first count look-ahead value; and adding the number representing the period of the faster clock domain to the second count value to create a second count look-ahead value.

27. The method as defined in claim 26 wherein incrementing the first and second count values further comprises:

latching the first count look-ahead value into the first count value; and selectively latching the second count look-ahead value into the second count value.

28. The method as defined in claim 19 wherein comparing the look-ahead values further comprises:

negating the second count value; and adding the first count value to the negated second count value thereby creating a sum value.

\* \* \* \* \*